April 25, 1950      J. POSLUSNY      2,505,340
EYE TRAINING DEVICE
Filed June 1, 1948
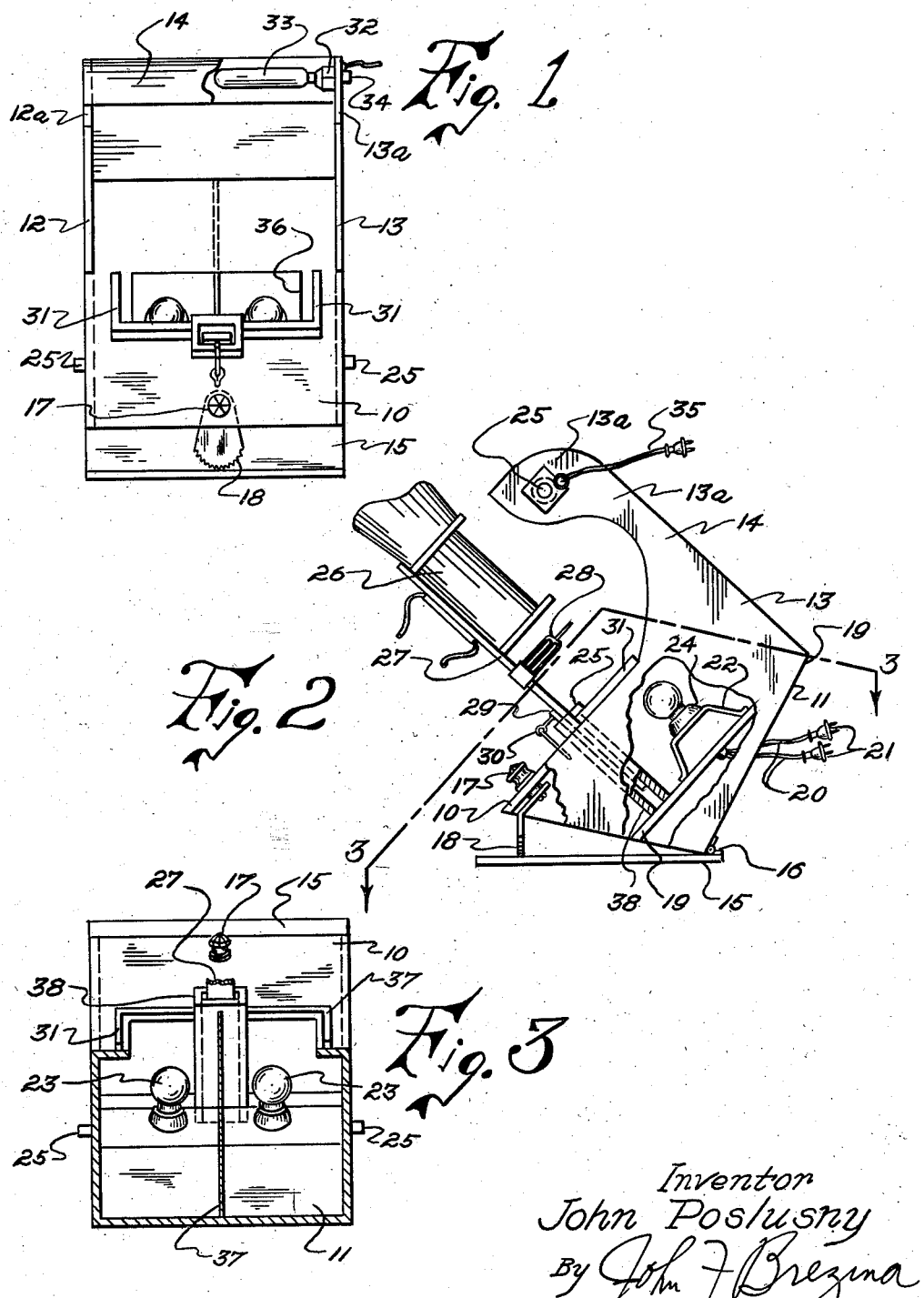

Patented Apr. 25, 1950

2,505,340

UNITED STATES PATENT OFFICE 2,505,340

EYE TRAINING DEVICE

John Poslusny, Chicago, Ill.

Application June 1, 1948, Serial No. 30,482

4 Claims. (Cl. 128—76.5)

This invention is directed to novel devices and apparatus for exercising, training the eyes and correcting various types of faulty and incorrect eye and muscular conditions.

It is known that certain types of abnormal or incorrect conditions of eyes and of eye muscles are capable of correction without the aid of glasses, though with periodical though frequent exercises. Over a period of many years I have found that numerous patients who have eye and vision faults of the types correctable by a course of eye training and eye exercise earnestly begin to take such exercises, though cannot continue same either for a sufficiently long time or a sufficiently number of times or in sufficient frequency in order to gain any benefit from the few infrequent exercises which they have taken at the optician's office. These conditions of non-completion and failure of keeping up the training as prescribed have been in many instances due to lack of time or inability to pay or distance of travel to and from an optician's place of business.

It is a further object and accomplishment of my invention to provide a portable relatively inexpensive device of the herein described class which the patient may rent or borrow for the desired period and which will enable him or her to perform the prescribed eye exercise at home as often and as long as advisable and needed to procure the greatest benefit. Such devices include a housing, casing or shell having adjustable mounting means, light circuits and light globes, a stereoscope, and a slidable and adjustable eye chart mounting element whereby the charts may be moved toward and away from the viewer's eyes.

It is a further object of my invention to provide a novel adjustable portable eye training device having a casing provided with a projecting shield and having lights and light circuits, and means for adjustable mounting or guiding and supporting member with respect thereto and having slidably mounted eye chart holding means thereon.

Other further important objects of my invention will be apparent from the following description and appending claims.

One improvement of my invention is illustrated and described in the following.

Fig. 1 is a front elevational view of my eye training device.

Fig. 2 is a side elevation view.

Fig. 3 is a partially cross-sectional view taken on the line 3—3 of Fig. 2 and looking in the direction of the arrows, and having certain parts shown in elevation.

Referring to Figs. 1 and 2 I illustrate front and side views of a cabinet which may be made of wood, metal, plastic or other suitable material. Said cabinet includes the two front and back walls 10 and 11, and opposite side walls 12 and 13 all connected together to form corners as indicated. Numeral 14 designates a top wall which is secured between the upper edges of side walls 12 and 13 and between the projected extensions 12a and 13a of said side walls 12 and 13 respectively. Said curved extensions and the upper portion of the top wall 14 form and comprise an inclined shield or hood.

A bottom or base panel 15 is pivoted at the edge thereof by hinges 16 to the rear wall 11 as indicated. Said panel comprises a pivoted base whereby the device may be adjustably mounted. A handle 17 is journalled in wall 10 and has secured on its inner end by a screw a manually rotatable adjustable metal plate or cam 18 which preferably has a plurality of peripheral teeth and serrations as indicated in Fig. 1 which are adapted to engage the inner face of base panel 15 in adjusted positions to aid in holding the device in adjusted inclined or tilted positions as desired by the particular user.

As shown in Fig. 2, the cabinet or housing has an interior wall or panel 19 preferably extending from the upper corner to the lower edges of side walls 12 and 13. This panel 19 is apertured and electric cords 20 pass therethrough. Said cords 20 carry the usual receptacle plugs 21, as illustrated and each has interposed therein a suitable on-and-off switch, the handle portions of said switches being shown as 25 in Figs. 1 and 3.

Said panel 19 carries a pair of mounting elements or brackets 22 which are suitably secured thereto and on each of which is mounted a light socket fixture 24 which carries a light globe 23. Said mounting brackets or members 22 are spaced apart as illustrated in Fig. 3.

As shown in Figs. 1, 2, and 3, said device is provided with a tube, tunnel or passaged channel member 38 which projects forwardly from wall 10, and extends through said wall and to a point adjacent the rear wall 11 to which it is preferably secured. This longitudinally passaged tube, which is illustrated as of rectangular cross section, provides a removable mounting means for a stereoscope 26 whose guiding and supporting member 27 has slidably mounted thereon a card holding frame 28 which carries spring clips adapted to hold a viewing cord or chart in the desired position. Numeral 29 is a wedge attached to wall 10 by staple and pin 30 and said wedge is adapted to be pressed into the space between member 27 and the wall of tube 38 to removably hold the stereoscope at the desired position with respect to the device.

Numeral 31 designates a U-shaped bar, shelf or support, as shown in Figs. 1 and 2 upon and into which the desired eye test charts may be placed, certain of which may be of light transparent sheet material.

As shown in Fig. 1, a light socket 32 is mounted in one side wall 13a of the device which carries a light socket 33 and a projecting control switch 34 is interposed in circuit wire 35 which wire may be either connected to a power source by means of a plug as indicated or may be connected to one pair of the power source wires 20.

The front wall 10 has a relatively large opening 36 through which the light rays of globes 23 pass. A partition wall, panel or baffle 37 is interposed between the two light globes 23, the same being preferably secured to front and rear walls 10 and 11 so that the light from one globe will not enter the compartment provided of the other globe. This is of advantage as in various eye exercises only one of the globes is lit at intervals, according to whichever eye is to receive a given prescribed type of exercise.

There are many types of abnormal eye and sight conditions which may be gradually and completely corrected by the proper eye exercises with the use of proper eye charts. Among these conditions are those in which due to muscular contraction or pull one or both eyes are held in non-focusing position, also commonly referred to as astigmatism. Such eye charts are usually contained on suitable rectangular cards which may selectively position either in the folding frame 28, which is slidably movable to desired focus, or placed in the shelf or support 31 of my device.

I have found that home eye exercises taken frequently and pursuant to a doctor's instructions bring about a quicker and more satisfactory result with the use of an eye training device such as I have described which provides a means for correct usage by the patient of the charts selected for his particular condition, and my device permits daily or frequent use and eye training between periodical consultations and tests in a doctor's office.

The provision of selectively operable switches and the spaced apart lighting elements in separate compartments provide for selective exercising of either eye, as in many instances the abnormal condition to be exercised exists in but one of the two eyes.

As many changes could be made in the above construction, and many apparently widely different embodiments of my invention, within the scope of the claims, constructed without departing from the spirit or scope thereof, it is intended that all matter contained in the accompanying specification shall be interpreted as illustrative and not in a limiting sense.

I claim:
1. In a device for training human eyes having a cabinet, and having a baffle dividing said cabinet in two compartments, said cabinet having a large forward opening; a shelf on the front wall of said cabinet adapted to support charts or the like; a tube in said cabinet and opening forwardly; a stereoscope releasably connected to said tube-like member and adapted to be secured in adjusted positions; means for releasably securing a portion of said stereoscope in said tube in adjusted positions; a manually controllable electric light in each of said compartments and adapted to supply light from behind a chart supported by said shelf; switch means for controlling said electric lights and an adjustable chart holding frame on said tube.

2. In a portable eye exercising device having a cabinet having two compartments, an adjustable base on said cabinet; a projecting hood on said cabinet, and having a manually operable light in said hood; controllable light elements in said compartments adapted to be connected to a light source; and a manually adjustable cam on said cabinet for supporting said cabinet in the desired position; a tube extending outwardly from said cabinet; an eye training chart support on the front wall of said cabinet, the lights in said compartments being adapted to illuminate an eye training chart held in said support; an adjustable eye training chart holder mounted on said tube, the light in said hood being adapted to illuminate an eye training chart held in said support or in said holder; and a stereoscope adjustably and releasably mounted on said tube.

3. In an eye exercising device, a casing having two adjacent compartments opening at their forward portions; means for removably supporting visual test charts adjacent said openings; a tube-like member opening in the front forward wall; a stereoscope releasably connected to said tube-like member; and an adjustable test chart holding means on said tube-like member.

4. In an eye exercising device, a casing having two adjacent compartments opening at their forward portions, said casing having a pivoted adjustable base whereby the angle and position of said casing may be selectively adjusted; an outwardly projecting hood on said casing; lights in said hood and within said compartments and being selectively operable; means for removably supporting visual test charts adjacent said openings; a tube-like member extending outwardly from said compartments; an adjustable stereoscope releasably secured in said tube-like member; and a manually adjustable test chart holding member mounted on said tube-like member intermediate said stereoscope and said test chart supporting means, said lights being adapted to illuminate an eye training chart held in said chart supporting means or in said chart holding means.

JOHN POSLUSNY.

REFERENCES CITED

The following references are of record in the file of this patent:

UNITED STATES PATENTS

| Number | Name | Date |
|---|---|---|
| 1,373,847 | Waite | Apr. 5, 1921 |
| 1,967,625 | Parkins | July 24, 1934 |
| 2,149,148 | Rones | Feb. 28, 1939 |